United States Patent
Mathur et al.

[11] Patent Number: 5,572,544
[45] Date of Patent: Nov. 5, 1996

[54] ELECTRIC ARC FURNACE POST COMBUSTION METHOD

[75] Inventors: Pravin C. Mathur, White Plains; Zhiyou Du, Croton-on-Hudson; Ronald J. Selines, North Salem, all of N.Y.

[73] Assignee: Praxair Technology, Inc., Danbury, Conn.

[21] Appl. No.: 278,203

[22] Filed: Jul. 21, 1994

[51] Int. Cl.[6] .................................................. F27D 17/00
[52] U.S. Cl. ................................ 373/8; 373/9; 373/72; 75/526; 75/530
[58] Field of Search ......................... 373/8, 9, 72, 80–85; 75/530, 523, 526, 528; 266/47; 110/238

[56] References Cited

U.S. PATENT DOCUMENTS

| | | | |
|---|---|---|---|
| 3,839,017 | 10/1974 | Schempp | 75/52 |
| 4,007,034 | 2/1977 | Hartwig et al. | 75/46 |
| 4,302,244 | 11/1981 | Sieckman et al. | 75/60 |
| 4,497,656 | 2/1985 | Robert | 75/60 |
| 4,537,629 | 8/1985 | Lazcano-Navarro et al. | 75/130 R |
| 4,574,714 | 3/1986 | Bach et al. | 110/346 |
| 4,599,107 | 7/1986 | Masterson | 75/59.2 |
| 4,699,654 | 10/1987 | Maddever et al. | 75/10.45 |
| 4,796,277 | 1/1989 | Maddever et al. | 373/72 |
| 4,986,847 | 1/1991 | Knapp et al. | 75/525 |
| 5,065,985 | 11/1991 | Takahashi et al. | 266/156 |
| 5,444,733 | 8/1995 | Coassin et al. | 373/72 |

FOREIGN PATENT DOCUMENTS 257450  3/1988  European Pat. Off. .

OTHER PUBLICATIONS

Ibaraki etal, Development Of Smelting Reduction Of Iron Ore, I&SM, Dec., 1990, pp. 30–37.
Aderup etal, New Tools For Improved Operation Of High Efficiency Electric Arc Furnaces, AGA AB, 1992.

Primary Examiner—Tu Hoang
Attorney, Agent, or Firm—Stanley Ktorides

[57] ABSTRACT

A method for carrying out post combustion in an electric arc furnace comprising forming a preferential gas stream within the electric arc furnace, concentrating carbon monoxide within the gas stream, and providing post combustion oxygen into the gas stream where the carbon monoxide is concentrated.

11 Claims, 1 Drawing Sheet

ELECTRIC ARC FURNACE POST COMBUSTION METHOD

TECHNICAL FIELD

This invention relates generally to steelmaking employing an electric arc furnace and more particularly to post combustion in the practice of electric arc furnace steelmaking.

BACKGROUND ARE

The melting or refining of iron or steel is an energy intensive process in that very high temperatures are required to attain and maintain a molten metal bath. Accordingly, there has occurred in the steelmaking industry a continuing effort to use the available energy more efficiently. One such practice which is widely used in steelmaking is post combustion. In a steelmaking molten metal bath, oxygen reacts with carbon to form carbon monoxide which bubbles up and out of the bath. Post combustion is the injection of secondary oxygen into the steelmaking vessel to react with the generated carbon monoxide to form carbon dioxide. In addition, hydrogen and/or hydrocarbons may also be present or formed, for example, by the breakdown of contaminants associated with steel scrap or the partial oxidation of methane gas or coal, and such hydrogen and/or hydrocarbons may react with secondary oxygen in a post combustion reaction to form water and carbon dioxide. These reactions are exothermic and much of the resulting released energy is gainfully employed as heat in the steelmaking vessel.

Significant work has been done in recent years to improve post combustion practice in steelmaking. In U.S. Pat. No. 4,599,107—Masterson, there is disclosed a method for carrying out post combustion in subsurface pneumatic steel refining wherein secondary oxygen is injected through a lance into the headspace above the bath surface. The lance height above the bath and/or the velocity of the injected secondary oxygen are adjusted to satisfy a defined relationship to enable the efficient practice of the post combustion.

U.S. Pat. No. 5,065,985—Takahashi et al. teaches an improved method for smelting reduction of iron ore wherein post combustion oxygen is injected into the slag layer, which is also strongly stirred, so that the post combustion occurs mainly within the slag layer. The paper by Ibaraki et al. entitled Development of Smelting Reduction Of Iron Ore—An Approach To Commercial Ironmaking, I&SM, 12, 1990, pp. 30–37, teaches a similar post combustion practice wherein the oxygen molecules remain in the jet until they collide with the foamy slag and are transferred into it. The oxygen burns the carbon monoxide and hydrogen in the foam. Different effects are attained by the degree to which the secondary oxygen jet penetrates or agitates the slag.

An electric arc furnace is employed to melt metal such as steel for subsequent refinement. An electric arc furnace generally comprises a relatively short, wide, cylindrical enclosure having a relatively wide and shallow hearth within which metal is melted. It has one or more electrodes, generally three, which pass through the furnace roof and are centrally arranged within the furnace to provide electrical energy to heat and melt the metal. Post combustion has also been used in electric arc furnace practice such as disclosed in European Patent No. 257,450—Brotzmann et al. wherein the top injected oxygen is injected into the upper region of an electric arc furnace through a plurality of top blowing devices oriented so as to provide coverage over the entire furnace for the uniform combustion of carbon monoxide. U.S. Pat. No. 4,986,847, Knapp et al. teaches the provision of oxygen in a region adjacent the molten metal within the slag layer.

The use of electric arc furnaces is increasing as more scrap metal is being recycled. Thus any improvement in the operation of electric arc furnaces would be useful and desirable.

Accordingly, it is an object of this invention to provide a method for employing post combustion in electric arc furnace practice which will improve the operation of electric arc furnaces.

SUMMARY OF THE INVENTION

The above and other objects, which will become apparent to those skilled in the art upon a reading of this disclosure, are attained by the present invention which is:

A method for carrying out post combustion in an electric arc furnace comprising:

(A) melting metal within an electric arc furnace, said furnace having at least one electrode located within the central zone of the furnace and an exhaust port located outside the central zone of the furnace;

(B) generating carbon monoxide within the furnace;

(C) forming a gas stream from within the furnace to the exhaust port and passing carbon monoxide generated within the furnace toward the exhaust port within said gas stream;

(D) providing oxygen into the gas stream; and (E) reacting said oxygen with said carbon monoxide within said gas stream upstream of said exhaust port.

As used herein the term "central zone" means the inner volume of an electric arc furnace which includes the electrodes of said furnace.

As used herein the term "molten metal bath" means the contents within an electric arc furnace comprising liquid metal with or without slag.

DETAILED DESCRIPTION

The invention comprises, in general, the recognition that within an electric arc furnace, because of the relative location of the electrodes and with an exhaust port in the upper portion of the furnace away from the electrodes, carbon monoxide tends to concentrate in a certain area or areas. Heretofore in post combustion practice, it has been the aim to burn carbon monoxide and other combustibles uniformly throughout the furnace so as to provide heat uniformly to the metal. Applicants have found that in the specific instance of post combustion practice in an electric arc furnace, advantageous results are attained by providing post combustion oxygen into the furnace at a particular location. Although this results in a localized generation of heat, because the particular location contains a disproportionately large amount of the generated carbon monoxide, the post combustion is carried out more efficiently and a much higher level of heat is liberated and transferred to the molten bath compared with conventional practice. Moreover, the defined provision of the post combustion oxygen reduces the degree to which such secondary oxygen reacts with other furnace contents, thus furthering the advantages attainable with the practice of the invention.

Figure 1:
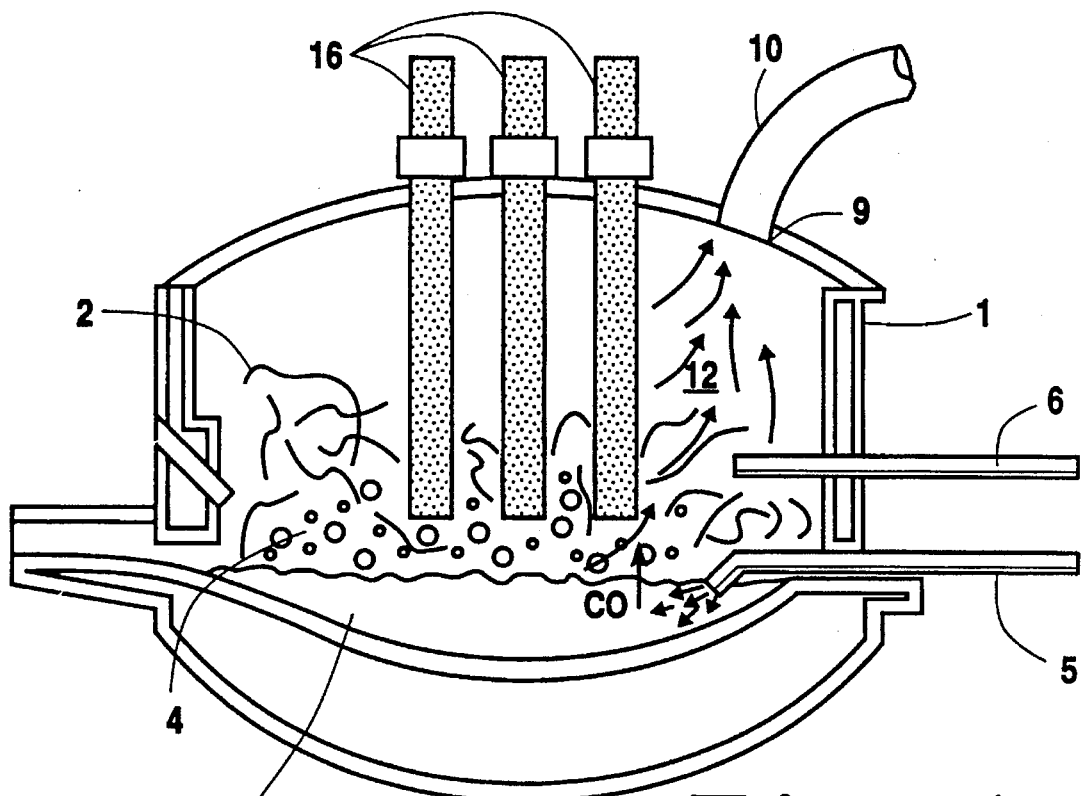
FIG. 1 is a cross-sectional representation in elevation of one electric arc furnace arrangement which may be used in the practice of the invention.
Figure 2:
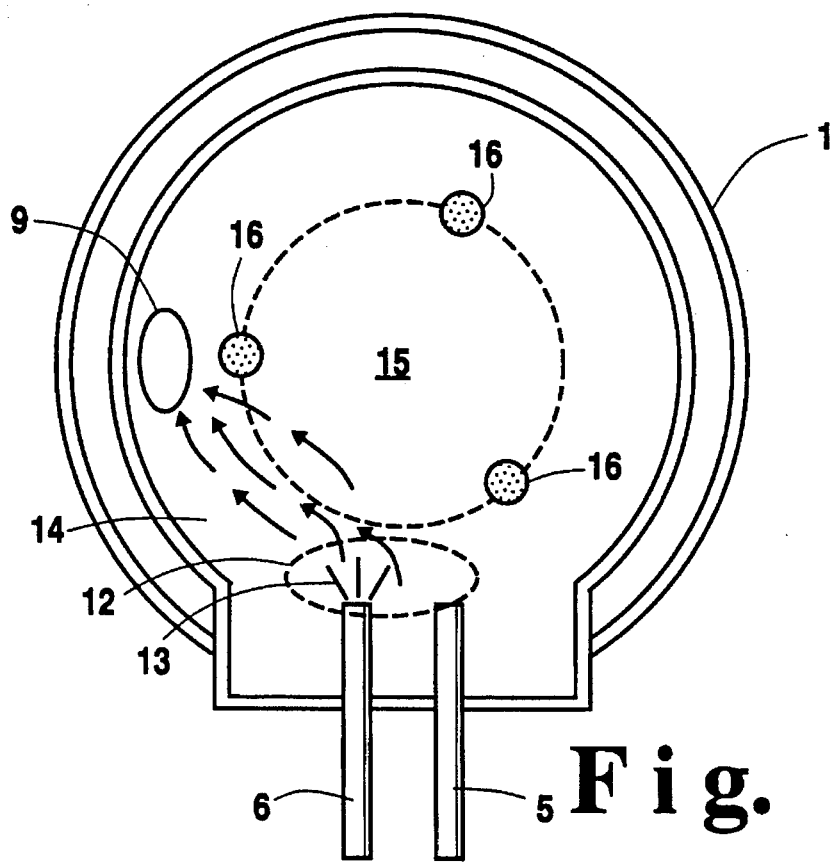
FIG. 2 is a simplified plan view representation of the electric arc furnace illustrated in FIG. 1. The numerals in the Drawings are the same for the common elements.

The invention will be described in detail with reference to the Drawings. Referring now to FIGS. 1 and 2, there is illustrated electric arc furnace 1 containing metal 2 to be melted. The metal is generally scrap steel although any other suitable materials, such as pig iron, direct reduced iron, hot briquetted iron, hot metal and iron oxides of various forms may be used. At least one electrode is located within central zone 15. The electrode or electrodes may be totally or partially within the central zone. In the embodiment illustrated in the Figures there are shown three such electrodes 16.

Electricity is provided to the electrodes and electric arcs are formed between the electrodes and/or between the electrodes and the metal. The resulting heat serves to melt the metal thus forming a molten metal bath within the electric arc furnace. The molten metal bath comprises molten or liquid metal 3 and may also comprise slag 4 which at times may contain significant amounts of gas thereby creating a slag foam. Generally the slag foam is present during about one quarter of the time the melting furnace is in operation. The slag generally comprises one or more of calcium oxide, silicon dioxide, magnesium oxide, aluminum dioxide and iron oxide.

Main oxygen may be provided into the molten metal bath in gaseous form through lance 5. This main or primary oxygen may be provided in the form of air or a mixture having an oxygen concentration exceeding that of air. Preferably the main oxygen is provided to the molten metal bath as a fluid having an oxygen concentration of at least 80 mole percent. The main oxygen may also be provided to the bath in solid form such as iron oxide. The main oxygen reacts with carbon in the molten metal bath to generate carbon monoxide. The carbon in the molten metal bath may be from one or more sources such as carbon associated with the metal, a carbon addition directly to the molten metal bath, or a hydrocarbon addition to the molten metal bath with or near the main oxygen. The reaction of oxygen with carbon in the molten metal bath to form carbon monoxide provides additional heat to the furnace, provides bath stirring and foams the slag to allow more efficient heat transfer from the electric arcs to the bath.

Exhaust port 9, generally in the roof of furnace 1, communicates with exhaust duct 10 which serves to pass furnace gases out from the furnace. The exhaust port is located outside the central zone of the furnace. This portion is designated 14 in FIG. 2. The flow of furnace gases out through exhaust port 9 and duct 10 causes a gas stream to form within the electric arc furnace. The gas stream may pass from the scrap to the exhaust port or, if a bath is present, from the slag on top of the molten metal, to the exhaust port. That is, the gas stream may originate from within the foamy slag. This gas stream is designated as 12 in the Drawings.

Gas stream 12 is comprised of the furnace gases within the electric arc furnace. In addition to one or more combustibles, i.e. carbon monoxide, hydrogen and hydrocarbons, the furnace gases may include carbon dioxide, water vapor, nitrogen and/or oxygen. Carbon monoxide, which has formed in the scrap or has bubbled out from the molten metal bath or is still within the slag, is preferentially drawn into the gas stream as opposed to flowing to other portions of the furnace. Thus, the flow dynamics action of the gas stream serves to concentrate the carbon monoxide, as well as other combustibles such as hydrogen or hydrocarbons, within the gas stream as the gas stream flows from the surface of the molten metal to the exhaust port.

Secondary or post combustion oxygen 13 is provided into gas stream 12 from lance 6. The secondary oxygen may be provided in the form of air or a mixture having an oxygen concentration exceeding that of air. Preferably the secondary oxygen is provided into the gas stream as a fluid having an oxygen concentration of at least 80 mole percent. The secondary oxygen may be provided during the entire time or only a portion of the time that the furnace is in operation. The secondary oxygen is provided into the gas stream above the molten metal. Preferably, if a slag is present, the secondary oxygen is provided within the slag. The secondary oxygen may also be provided within the scrap. Preferably the secondary oxygen is provided as low as possible, i.e. close to a point or the points of formation of the gas stream passing to the exhaust port, so as to increase the residence time of the secondary oxygen within the gas stream thus improving the degree of post combustion and the transfer of the liberated heat to the scrap and/or molten metal bath.

The secondary oxygen reacts with carbon monoxide within the gas stream before it reaches the exhaust port, forming carbon dioxide in an exothermic reaction within the electric arc furnace. The secondary oxygen will also react with other combustibles which may be present within the gas stream. The other combustibles, such as hydrogen or hydrocarbon gas, may be formed within the furnace by the breakdown of contaminants associates with the scrap or by other ways such as the partial oxidation of methane or other hydrocarbons. The resulting heat is then gainfully employed to heat and/or melt the metal. Even though the post combustion reaction occurs in a localized area of the furnace, because the reactants, oxygen and carbon monoxide and other combustibles, are concentrated in this area, the post combustion reaction proceeds with high efficiency and high heat production resulting in overall better results than if post combustion were carried out uniformly throughout the furnace. Equipment costs are also reduced since only one, or in any event, a smaller number, of post combustion lances are needed to carry out the invention compared with conventional practice. The secondary oxygen may be provided by means of a separate lance from that of the main oxygen, as illustrated in the Figures, or may be provided through a dual circuit lance which also provides the main oxygen into the furnace through a separate oxygen circuit.

The following example is provided for illustrative purposes and is not intended to be limiting. The invention was carried out in a 60 ton electric arc furnace similar to that illustrated in FIGS. 1 and 2. The furnace was charged with steel scrap and melting was begun. The post combustion oxygen was provided into the furnace gas stream passing to the exhaust port, at first within the scrap pile and later, when a foamy slag had formed, within the foamy slag. Carbon monoxide and other combustibles were combusted within the furnace gas stream within the furnace liberating heat which assisted in the melting of the scrap. For comparative purposes the procedure was repeated except that the post combustion oxygen was not used. The difference in electric power consumption between the electric arc furnace practice with and without the practice of the invention was 40 Kwh/ton. This corresponds to a heat transfer rate of 4.75 Kwh/NM$^3$ of oxygen which is 81 percent of the total rate of post combustion heat release, clearly demonstrating the advantageous results attainable by practice of the invention.

The invention is specific to electric arc furnace practice because it is the centrally located electrode or electrodes which create the conditions, e.g. the off-centered exhaust port of the invention, by which the gas stream forms within the furnace. Although the invention has been described in detail with reference to a certain preferred embodiment, those skilled in the art will recognize that there are other embodiments of the invention within the spirit and the scope of the claims.

We claim:

1. A method for carrying out post combustion in an electric arc furnace having at least one electrode and an exhaust port comprising:

(A) forming a molten metal bath comprising molten metal and carbon within the electric arc furnace;

(B) providing main oxygen into the molten metal through the upper portion of the molten metal bath and not providing any oxygen into the molten metal through the bottom of the molten metal bath, and reacting main oxygen with carbon within the molten metal to generate carbon monoxide within the furnace to provide heat to the furnace and to stir the bath;

(C) forming a gas stream within the furnace from where the main oxygen is provided into the molten metal to the exhaust port and passing carbon monoxide generated within the furnace toward the exhaust port within said gas stream;

(D) providing post combustion oxygen into the gas stream above the molten metal and close to the formation of the gas stream; and (E) reacting said post combustion oxygen with said carbon monoxide within said gas stream and forming carbon dioxide in an exothermic reaction within the electric arc furnace.

2. The method of claim 1 wherein the metal comprises steel.

3. The method of claim 1 wherein the metal comprises iron.

4. The method of claim 1 wherein the oxygen is provided into the gas stream as a fluid having an oxygen concentration of at least 80 mole percent.

5. The method of claim 1 wherein the oxygen is provided into the gas stream above the molten metal bath.

6. The method of claim 1 wherein the molten metal bath comprises a slag and the post combustion oxygen is provided into the gas stream within the slag.

7. The method of claim 1 wherein the electric arc furnace contains scrap and the oxygen is provided into the gas stream within the scrap.

8. The method of claim 1 wherein the gas stream additionally comprises hydrogen further comprising reacting post combustion oxygen with said hydrogen within said gas stream.

9. The method of claim 1 wherein the gas additionally comprises hydrocarbon gas further comprising reacting post combustion oxygen with said hydrocarbon gas within said gas stream.

10. The method of claim 1 wherein the main oxygen is provided into the molten metal in gaseous form.

11. The method of claim 1 wherein the main oxygen is provided into the molten metal in solid form.

* * * * *